April 1, 1958   L. N. HAYNES   2,828,599
TRACTOR MOUNTED MOWER
Filed Aug. 10, 1953   4 Sheets-Sheet 1

Lester N. Haynes
INVENTOR.

BY Jacks W. Hayden
ATTORNEY

Lester N. Haynes
INVENTOR.

BY Jack W. Hayden
ATTORNEY

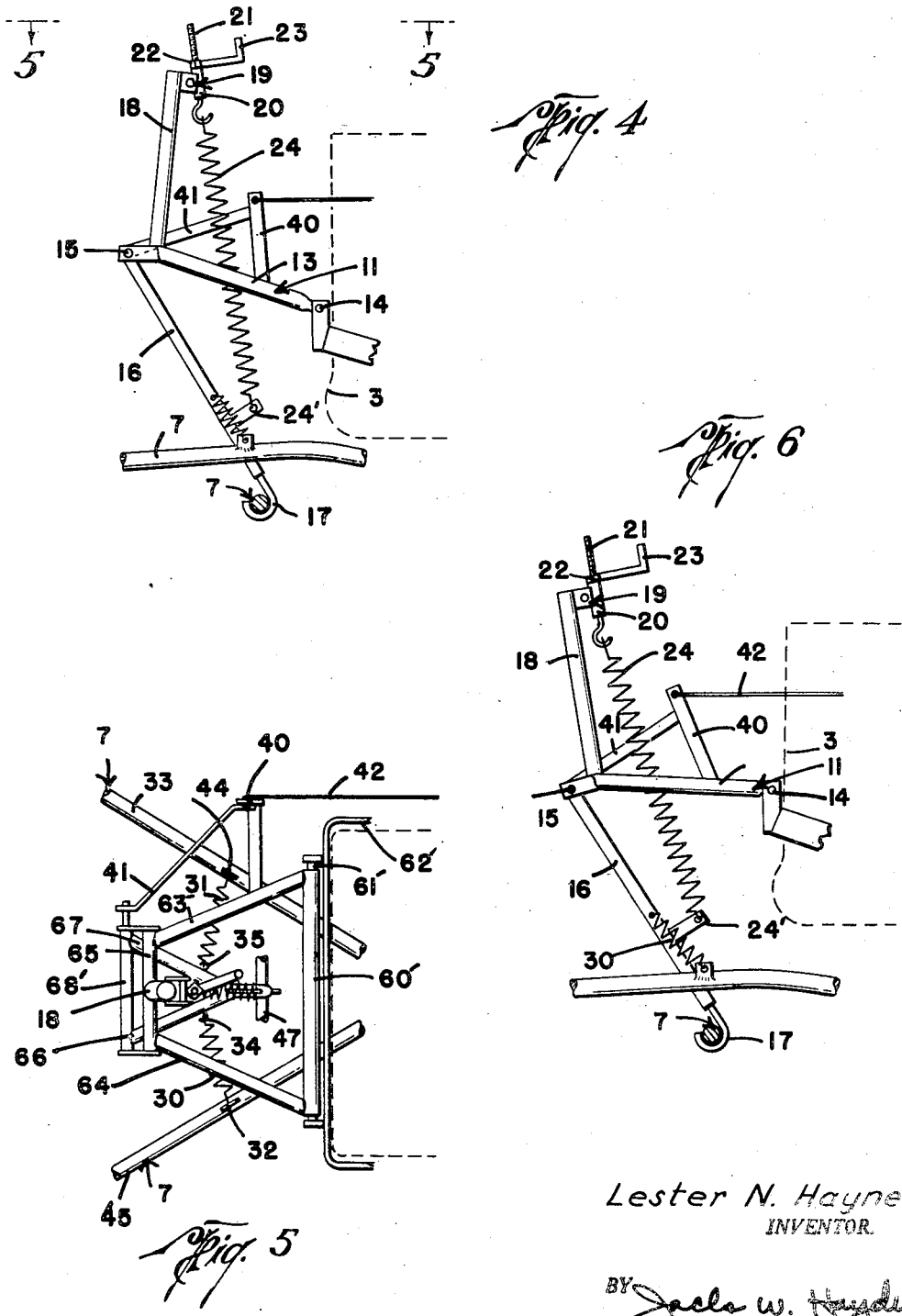

April 1, 1958 L. N. HAYNES 2,828,599
TRACTOR MOUNTED MOWER
Filed Aug. 10, 1953 4 Sheets-Sheet 4
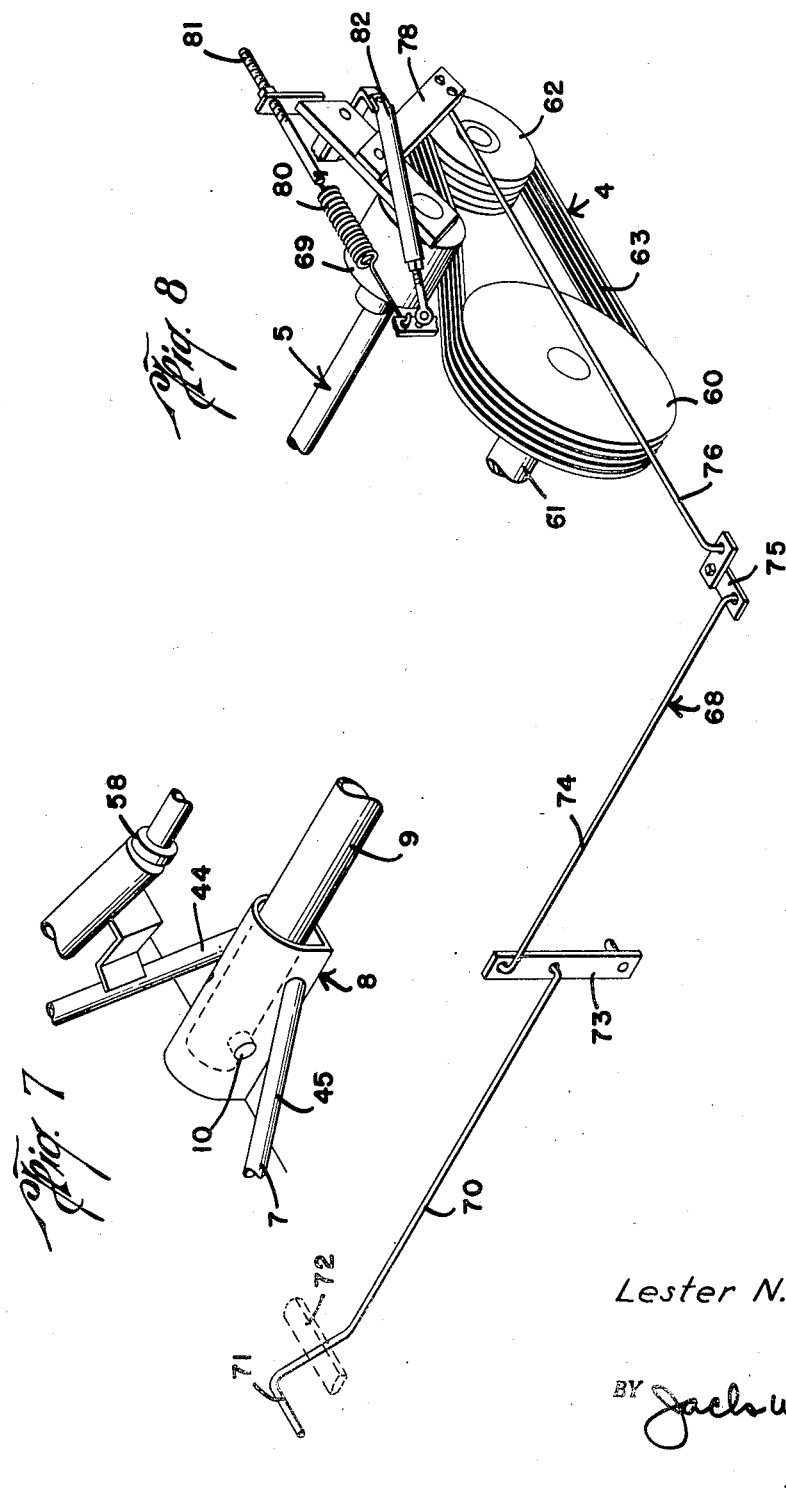
Lester N. Haynes
INVENTOR.
BY Jack W. Hayden
ATTORNEY

United States Patent Office 2,828,599
Patented Apr. 1, 1958

2,828,599

TRACTOR MOUNTED MOWER

Lester N. Haynes, Livingston, Tex.

Application August 10, 1953, Serial No. 373,204

1 Claim. (Cl. 56—25.4)

The present invention relates to a support for floatably carrying a mowing machine on a carrier such as a tractor or the like.

In clearing a plot of ground with a tractor mounted mowing machine, it is desirable that the support mechanism of such mower be flexible, whereby relative movement between the mowing mechanism and the carrier on which it is mounted may occur to accommodate passage of the mowing means and carrier over uneven terrain and foreign objects such as rocks, stumps, or the like.

Also, it is desirable that the power means for rotating the mowing means be arranged so that rotation of the mower is independent of movement of the tractor or carrier.

An object of the present invention is to floatably support a mower on a carrier such as a tractor or the like whereby relative movement in both vertical and lateral planes between such carrier and the mowing mechanism may occur.

Still another object of the invention is to provide a device for supporting mowing means on a carrier including a carriage, skid means to guide the carriage, support means connected between said carriage and the carrier, said support means including spring means to float said carriage.

A still further object of the invention is to provide a mowing machine wherein such mower is driven independently of movement of the carrier on which such mowing mechanism is mounted.

A still further object of the invention is to provide a drive and driven connection on a carrier which supports a mowing mechanism, there being a linkage connection for operatively engaging said drive and driven connections whereby rotation of said mowing mechanism may be controlled independently of movement of the carrier.

Yet a further object of the invention is to provide a device for supporting mowing means on a carrier whereby such mower may be moved over terrain to cut growth in situ, including a carriage, mower means horizontally disposed and rotatably mounted on said carriage, skid means rotatably mounted on said carriage to engage the terrain and guide said carriage thereover and support means connected between the carrier and said carriage including resilient means to floatably support said carriage.

Other objects and advantages of the invention will become more readily apparent from a consideration of the following description and drawings wherein:

Fig. 4 is a side view illustrating the preferred embodiment of the support connection between said carriage and carrier and showing the spring means for floatably supporting said carriage;

Fig. 5 is a top plan view of the preferred embodiment of the support arrangement;

Fig. 6 is a side view of the support arrangement showing the carriage in its lowered position relative to the carrier;

Fig. 7 is an enlarged partial perspective view illustrating the connection between the front and rear portions of the carriage; and Fig. 8 illustrates an enlarged perspective view of the drive and driven members with means for controlling said drive and driven members independently of the movement of the carrier.

Figure 1:
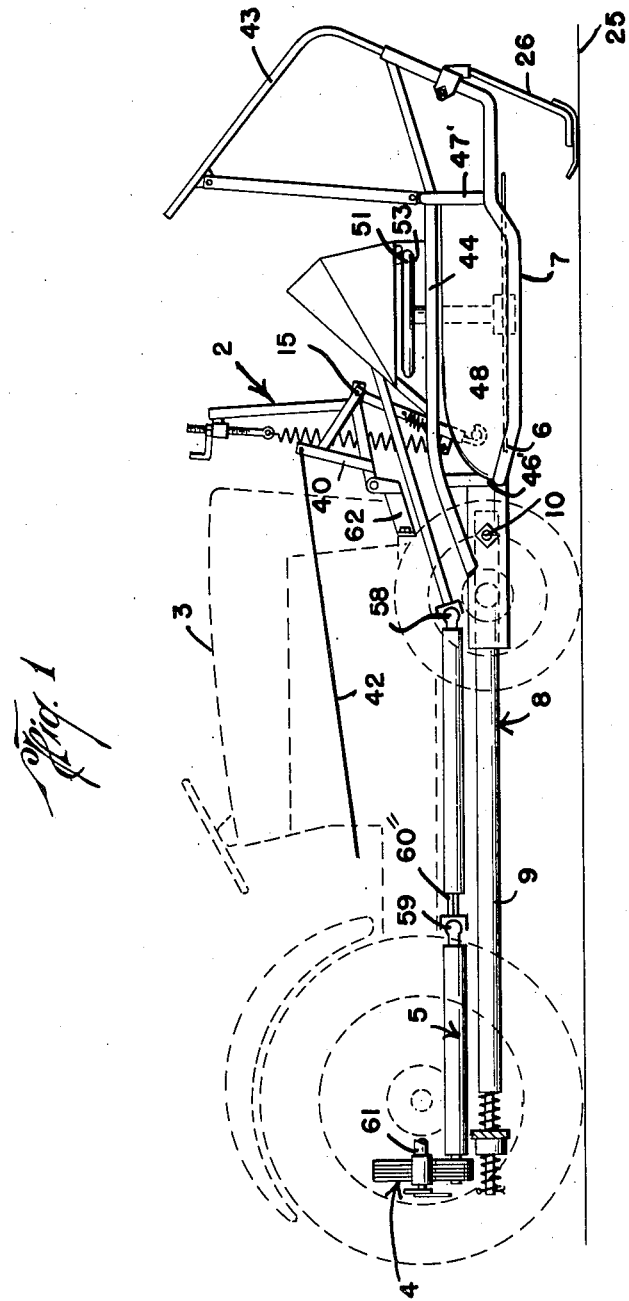
Fig. 1 is a side elevation showing the invention as being mounted on a carrier such as a tractor.

In Fig. 1, the invention illustrated generally by the numeral 2 is shown as being mounted on a carrier such as a tractor 3 or the like. The drive connection between the carrier 3 and the mowing means is illustrated by the numeral 4 and numeral 5, such numerals representing respectively the drive and driven members, and a drive shaft which is connected to such driven member whereby rotation may be transmitted to the horizontally disposed rotatably mounted mower blades 6. The blades 6 are supported in the forward portion 7 of the carriage which is generally denoted by the numeral 8. Such carriage comprises the forward portion 7 and the rearwardly extending portion 9 which may be in the form of a rod or shaft which extends below the tractor and is connected at the rear of such carrier in a manner as disclosed and claimed in my prior Patent No. 2,624,380, issued on January 6, 1953, for a Brush Saw.

As more clearly illustrated in Fig. 7, the rearwardly extending portion 9 and the forward portion 7 of the carriage 8 are pivotally connected together by means of the pin 10, whereby tilting movement between the carriage portion 7 and carriage portion 9 may occur.

The carriage is connected to carrier 3 so that relative movement between such carriage and the carrier may occur, whereby movement of the carriage over uneven or relatively rough terrain may be effected. Also, the device may be moved over other foreign objects in a plot of ground being cleared, such as rocks, stumps or the like and relative movement between the carriage and carrier allows the mowing blades 6 to move more easily over such foreign objects without causing such objects to become entangled in the device and thus cause damage thereto.

To this end, the support arrangement, or connection, denoted generally by the numeral 11 and more clearly shown in Figs. 4, 5 and 6 is provided to extend between the carrier and carriage and connect them together. The support arrangement or connecting means 11 includes a support 13 which extends forwardly from the carrier and over the carriage 7 as shown in Figs. 1, 4 and 6. The support 13 is mounted at 14 to the carrier 3 so that it may pivot upwardly, as shown in Fig. 4, and is provided at its outer end 15 with a downwardly extending support 16, which is pivotally connected to the forwardly extending support 13 at 15 and is in turn engaged with the carriage 7 by any suitable means such as the hook 17 which is engaged to the lower end of support 16 as shown in Figs. 1, 4 and 6. The support 13 is provided with an upwardly extending arm 18 which is adapted to receive spring retaining means 19 thereon. Spring retaining means 19 includes a sleeve 20 which receives the threaded hook 21, threaded engaging means 22 which abuts sleeve 20 and is adapted to engage the threaded hook 21, such threaded engaging means 22 being provided with any suitable means such as the crank 23 whereby it may be engaged therewith and the means 22 rotated so as to cause the threaded hook 21 to move through the sleeve 20. Resilient means 24 in the form of a coil spring has one end connected to the upstanding arm 18 by means of the threaded hook 21 and is connected at its lower end to the support 16, which in turn is connected to the carriage 7.

The spring 24 is connected to support 16 by any suitable means such as shown at 24' in Figs. 4 and 6 of the drawings.

The support 13 may be formed in any suitable manner and is shown as comprising member 60' pivotally mounted on pin 61' which is secured to carrier 3 by brace 62'. Arms 63' and 64 are connected to member 60' and extend forwardly in the same horizontal plane to member 65. Member 18 extends upwardly from member 65 as shown in Figs. 4, 5 and 6.

Support 16 is pivotally secured to support 13 at 15 which is an extension of arms 63' and 64. The support 16 includes members 66 and 67 which extend downwardly and toward each other from horizontal pivot member 68' as shown in Figs. 4, 5 and 6.

They may be joined together above hook 17 as shown in the drawings. This arrangement provides a support construction which is sturdy and will withstand impacts and shocks caused by relative movement between carrier 3 and carriage 7.

By adjusting the tension on spring means 24, with threaded means 22 and cooperating sleeve 20, the amount of support or lift imparted to the carriage 7 may be adjusted. Generally, the tension in spring 24 is maintained so that the forward end of the carriage may be engaged with one or two fingers and lifted off the terrain illustrated at 25.

Connected to the forward portion of the carriage and at each side thereof are skid means 26 for guiding such carriage over the terrain 25. The skid means are rotatably mounted at 27 to such carriage and thereby are adapted to turn as the carrier and supported carriage turns. These skids in cooperation with the floating arrangement above described will cause the carriage to lift up off the ground when the device hits a boulder or stumps. This prevents undue damage to the mowing blades, since they may move upwardly if they should happen to engage a large stump or rock.

It is to be noted that the spring 24 extends substantially in a vertical plane relative to the carriage 8 to accommodate relative vertical movement between such carriage and the carrier 3. Also, since the spring 24 has a predetermined amount of tension therein, the carriage portion 7 is floatably carried thereby so that most of the weight of such carriage is supported by such spring. This provides a construction which facilitates relative movement between the carriage and the carrier.

Figure 2:
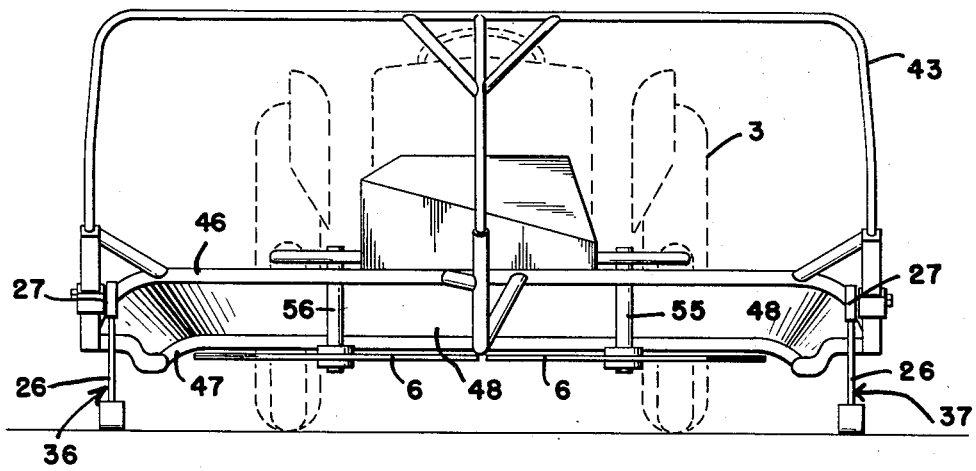
Fig. 2 is a front view showing the skid means for guiding the carriage over the terrain.

The carriage 8 and the carrier 3 may move laterally relative to each other. To facilitate this action and to return such carriage to a predetermined normal position after it may have been moved laterally relative to the carrier, the springs 30 and 31 are provided which are connected at their outer ends 32 and 33 respectively to the carriage portion 7 and at their inner ends 34 and 35 to the downwardly extending support 16 of the connection 11. As illustrated in Figs. 4 and 6, the springs 30 and 31 extend from their connection on the carriage inwardly and upwardly towards the support 16, whereby lateral movement between the carriage and the carrier 3 may be accommodated. The springs also allow one side of the carriage such as that illustrated at 36 to move upwardly relative to the opposite side 37 for moving over foreign objects or stumps in the field being cleared. After the skid 26 has moved over such foreign objects, the springs 30 and 31 return the carriage 3 to its normal horizontal position as illustrated in Figs. 1 and 2.

Mounted on the connection 11 is the upwardly extending arm 40 and its brace 41 which is provided with suitable means such as a cable or rope 42, whereby the carriage may be tilted or raised in order to move it over the ground or terrain 25. As shown in Fig. 6, and with the carriage lowered to active position, the coil spring 24, having a predetermined amount of tension therein is stretched, with its coils spaced apart indicating that it is floatably carrying the carriage 7.

However, when the carriage has been tilted by means of the rope 42 connected to the arm 40, as shown in Fig. 4, the tension in such spring is somewhat relieved and the weight of the carriage is at least in part supported by such raising or tilting means.

The carriage portion 7 may be constructed in any suitable manner and as shown in the drawings is provided at its forward end with suitable means 43 for engaging growth to be mowed and guiding it so that such growth may be engaged by the mower blades 6. The carriage also includes arms 44 and 45 which diverge from each other at the pivotal connection 10 with the carriage portion 9, as illustrated in Fig. 7 and may be provided with suitable cross-bracing members 46 and 47 and vertical braces 46' and 47' as desired. The arms 44 and 45 are connected with the guide structure 43 at the forward end of the carriage as shown in Fig. 1. A cover 48 is mounted on the arms 44 and 45 and protects the resilient supporting arrangement from becoming fouled by severed growth. The hook 17 on the downwardly extending support 16 may be engaged with an eye which is welded to cover 48, or an opening may be provided in such cover 48 whereby the hook may be engaged with the cross-brace member 47.

Figure 3:
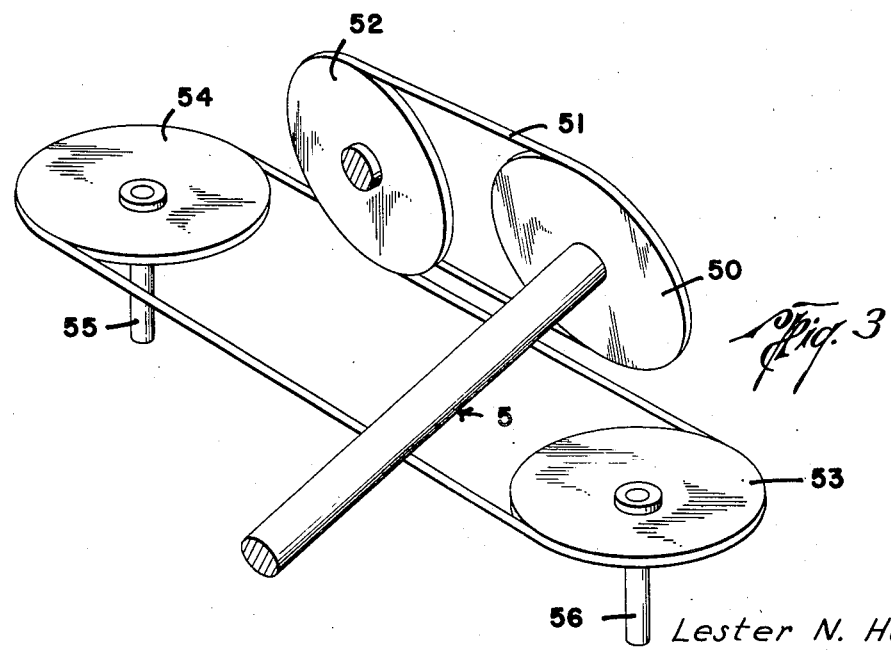
Fig. 3 is an enlarged perspective view illustrating the drive mechanism on the horizontally disposed rotatably mounted mowing blades.

It is extremely desirable that the mowing blades 6 be connected so that they may be rotated independently of movement of the carrier 3. The driving shaft 5 extends forwardly from the driving means 4 and as illustrated in Fig. 3 is provided with a pulley 50 and belt means 51 extends around pulley 52 and pulleys 53 and 54 which are connected to the vertical support shafts 55 and 56 of the horizontally disposed rotatable blades 6. The shafts 55 and 56 are rotatably mounted on and supported by carriage 7 in any suitable manner as shown in the drawings. The drive shaft 5 is provided with a universal joint 58 whereby the movement of the carriage relative to the carrier may be accommodated. Also, a universal joint is provided at 59 as well as a slip drive connection 60" to further accommodate the raising and lowering of the carriage by the belt 42, or relative movement of the carriage by foreign objects as previously discussed. The drive means 4 is more clearly illustrated in Fig. 8 and is shown as comprising a drive wheel 60 connected to the power takeoff shaft 61 of the carrier 3. A driven pulley 62 is connected to the drive shaft 5 and a plurality of belts 63 engage the drive and driven pulleys 60 and 62. Enough slack is maintained in the belt means 63 so that as the shaft 61 and pulley 60 rotates the belt means slidably engage with the pulleys 62. In order to drivingly engage the pulleys 60 and 62, a linkage mechanism generally denoted by the numeral 68 and a weighted member 69 is provided.

The linkage mechanism 68 includes a portion 70 which is provided with an upstanding end or pedal 71 arranged adjacent the clutch pedal, as illustrated at 72 of the carrier. The link 70 is pivotally engaged with the upstanding member 73 to which is pivotally connected also the link 74. The member 73 is, of course, secured to the carrier so that movement of link 70 is transmitted to link 74. The link 74 in turn is pivotally connected to the horizontally disposed L-shaped member 75 which is mounted on carrier 3, and an additional link 76 is pivotally connected to such member and to the member 78. The member 78 is mounted so as to move the weighted member 69, upon movement of the linkage mechanism. For example, by depressing the pedal 71 this movement is transferred through the connected links and members so as to raise the weighted member 69. When the weighted member is raised off the belt means 63, such belt means slips relative to the drive pulley 60; however, when the weighted member 69 is lowered onto the pulleys this causes the drive pulley and driven pulley 62 to be engaged together by the belt means thus transmitting a rotated force to the drive means 5. The drive shaft 5 rotates mower blades 6 through the belt 51 and pulleys 53 and 54 which are connected to the shafts 55 and 56 of such blades.

Suitable spring means 80 are provided whereby adjustment of the threaded shaft 81 connected thereto increases or decreases the tension on the weighted member 69 thereby serving as an adjustment means whereby the force applied against such belt means may be varied. A threaded shaft 82 is provided whereby the tension in the belt means 63 may be varied by adjustment of such shaft. Of course, such shaft in effect serves to move pulley 62 toward or away from the pulley 60 which in turn increases or decreases the tension of the belt means 63.

While it is believed that the operation of the invention is apparent by reason of the foregoing description, by way of further description and amplification, it will be assumed that the carriage is mounted on a carrier 3 such as a tractor. The connection 11 between the carrier 3 and the carriage portion 7 allows relative vertical and lateral movement between such carriage and carrier on which it is supported. The rotatable skids 26 guide the carriage over terrain on which the device is being used to mow growth, small shrubs, and the like. The vertical spring 24 has its tension adjusted so that it supports the weight of the carriage portion and associated elements, to such an extent that the carriage and elements may be lifted off the ground or terrain by grasping the carriage with one or two fingers and raising it. This amount of tension in the spring properly supports the carriage and allows relative movement between such carriage and the carrier, but prevents undue flopping or movement of the carriage as it is carried over the ground by the carrier 3. The connection 11, including support 13 and second support 16 which are pivotally connected respectively to the carrier and at 15 to each other and to the carriage 7 accommodates any relative movement between the carriage and carrier and also provides a means whereby the carriage may be raised while the carrier transports such carriage to a desired location that is to be cleared of small shrubs and weeds.

Broadly, the invention relates to a carriage construction which is floatably supported on a carrier.

What is claimed is:

A device for supporting mowing means on a carrier whereby such mower may be moved over terrain to cut growth in situ comprising a carriage, horizontally disposed, rotatably mounted mower means on said carriage, skid means rotatably mounted on said carriage for engaging the terrain and guiding said carriage thereover, means connecting said carriage and carrier together and accommodating relative movement therebetween as the carrier and carriage move over the terrain, said connecting means including a support pivotally secured to the carrier and extending over said carriage, a second support pivotally secured to said first support and extending downwardly therefrom to engage said carriage, spring means extending substantially vertically and connected at one end to said first mentioned support and at the other end to said second support whereby said carriage may be resiliently supported relative to the carrier, and additional spring means connected to said carriage at each side thereof and to said second support for accommodating relative lateral movement between said carriage and the carrier.

References Cited in the file of this patent

UNITED STATES PATENTS

| | | |
|---|---|---|
| 1,739,424 | Snell | Dec. 10, 1929 |
| 2,047,362 | Dunford | July 14, 1936 |
| 2,311,859 | Oehler | Feb. 23, 1943 |
| 2,465,405 | Strawn | Mar. 29, 1949 |
| 2,483,683 | Wells et al. | Oct. 4, 1949 |
| 2,539,934 | Smith et al. | Jan. 30, 1951 |
| 2,624,380 | Haynes | Jan. 6, 1953 |
| 2,732,675 | Smith et al. | Jan. 31, 1956 |